(12) United States Patent
Feuerherm et al.

(10) Patent No.: US 6,354,828 B1
(45) Date of Patent: Mar. 12, 2002

(54) EXTRUSION HEAD FOR BLOW MOLDED EXTRUDED PLASTIC CONTAINERS

(75) Inventors: Harald Feuerherm; Rolf Kappen-Feuerherm, both of Troisdorf (DE)

(73) Assignee: Harald Feuerherm, Troisdorf (DE)

( * ) Notice: Subject to any disclaimer, the term of this patent is extended or adjusted under 35 U.S.C. 154(b) by 0 days.

(21) Appl. No.: 09/488,607

(22) Filed: Jan. 20, 2000

(30) Foreign Application Priority Data

Jan. 27, 1999 (DE) ......................................... 199 03 084
Dec. 21, 1999 (EP) ............................................ 99125478

(51) Int. Cl.⁷ ............................................. B29C 47/22
(52) U.S. Cl. ...................... 425/532; 425/380; 425/381; 425/382.4; 425/465; 425/466
(58) Field of Search ................................. 425/532, 380, 425/381, 382.4, 465, 466; 264/541

(56) References Cited

U.S. PATENT DOCUMENTS

| 4,120,633 A | * | 10/1978 | Feuerherm ................... 425/462 |
| 4,124,351 A | * | 11/1978 | Garbuio ....................... 425/532 |
| 4,279,857 A | * | 7/1981 | Feuerherm ................... 264/541 |
| 4,382,766 A | * | 5/1983 | Feuerherm ................... 425/465 |
| 5,792,486 A | * | 8/1998 | Hsu ........................ 425/192 R |
| 5,900,260 A | * | 5/1999 | Hsu et al. ..................... 425/532 |
| 6,024,557 A | * | 2/2000 | Feuerherm ................... 425/532 |
| 6,284,169 B1 | * | 9/2001 | Feuerherm et al. ........ 264/40.1 |

FOREIGN PATENT DOCUMENTS

DE 28 23 999 6/1984

OTHER PUBLICATIONS

"Plastverarbeiter Publication" 44 (1993) No. 2, p. 28.

* cited by examiner

Primary Examiner—Nam Nguyen
Assistant Examiner—Joseph S. Del Sole
(74) Attorney, Agent, or Firm—Collard & Roe, P.C.

(57) ABSTRACT

An extrusion head for blow molding extruded plastic containers, with a ring gap nozzle having a mandrel and a ring-shaped nozzle body having an elastically deformable sleeve, and setting devices for radially deforming the elastic sleeve. The sleeve defines a nozzle gap, the width of which is variable by axially movement of the mandrel and/or of the nozzle body. The geometry of the gap can be changed by deforming the sleeve in the course of extrusion of a hose-like, pre-shaped blank. The sleeve is axially supported in the nozzle body, and/or on the mandrel only on segment-like surfaces.

24 Claims, 10 Drawing Sheets

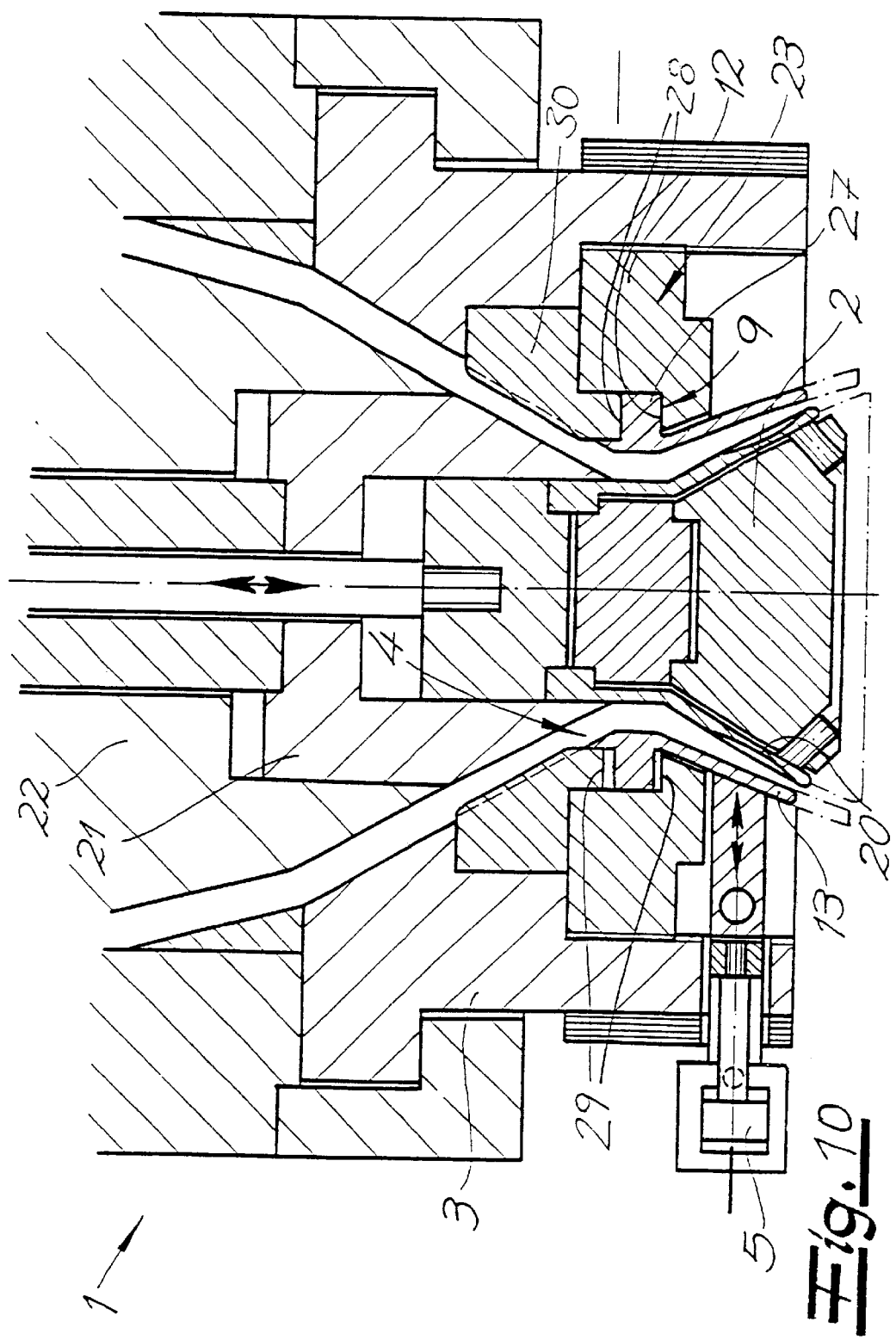

EXTRUSION HEAD FOR BLOW MOLDED EXTRUDED PLASTIC CONTAINERS

BACKGROUND OF THE INVENTION

1. Field of the Invention

This invention relates to an extrusion head for blow molded extruded plastic containers.

More specifically, this invention is related to an extrusion head with a ring gap nozzle having a mandrel and a ring-shaped nozzle body, an elastically deformable sleeve, and setting devices for radially deforming the elastic sleeve, whereby the sleeve defines a nozzle gap. The geometry of the nozzle gap is defined by deforming the elastic sleeve during the course of extrusion of a hose-like pre-shaped blank.

2. The Prior Art

The prior art discloses a multitude of extrusion heads disposed next to each other as a multiple blow head [see "Plastverarbeiter Publication" 44 (1993), No. 2, page 28]. With such a design, it is possible to mechanically couple the setting devices associated with the extrusion heads with each other in order to reduce the number of required, expensive drives.

With a design known from FIG. 6 of German Patent DE-C 28 23 999, the lower edge of the sleeve is supported on the body of the nozzle. This design has been successfully employed in industries for producing pre-shaped blanks having large diameters. However, problems may arise in the production of hose-like, pre-shaped blanks with a small diameter. With a ring gap nozzle with a smaller diameter, it is necessary to use a very thin-walled sleeve, so that the sleeve can be deformed as required for providing the annular gap with the desired profile. The support surface on the lower edge of the sleeve is correspondingly small. Thus, when the mandrel is extended in combination with a deformation of the sleeve, there is the risk that the melt, when exiting from the gap of the nozzle, accumulates on circumferential sections of the holding ring belonging to the body of the nozzle. This leads to markings and differences in the wall thickness in the hose, resulting in a loss of quality of the plastic container that is blow molded from the hose. This accumulation in the hose is also often connected with adhesion problems causing production trouble.

With a design shown in FIG. 7 of German Patent DE-C 28 23 999, the sleeve, at its end on the inlet side, has a dimensionally stable collar, with a flange surface extending circumferentially in the form of a ring. The flange surface in supported in the body of the nozzle over its entire surface area. The axial forces exerted on the sleeve by the flow of the melt are fed into the body of the nozzle via the collar.

SUMMARY OF THE INVENTION

The invention further provides an improved extruder head with the features described above so that extensive and largely wear-free deformations and displacements are possible at the end of the sleeve located on the hose outlet side, whereby accumulation of the melt in the body of the nozzle is extruded as such melt exits from the outlet gap of the nozzle.

The problem is solved according to the invention in that the sleeve is axially supported only on segment-shaped surfaces. The sleeve can be elastically deformed to alter the geometry of the gap to generate different thicknesses of the plastic container.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 9b is a longitudinal view of section D—D of FIG. 9a.

FIG. 10 is another embodiment in which the extrusion head has an elastically deformable sleeve which is inserted in the nozzle body.

DETAILED DESCRIPTION OF THE PREFERRED EMBODIMENT

The devices shown in the Figures are employed for blow molding extruded plastic containers, which may have different container cross sections. In such a process, a hose-like pre-shaped blank consisting of a thermoplastic melt is extruded from an extruder head and expanded to a plastic container in a blow mold, not shown.

Figure 1:
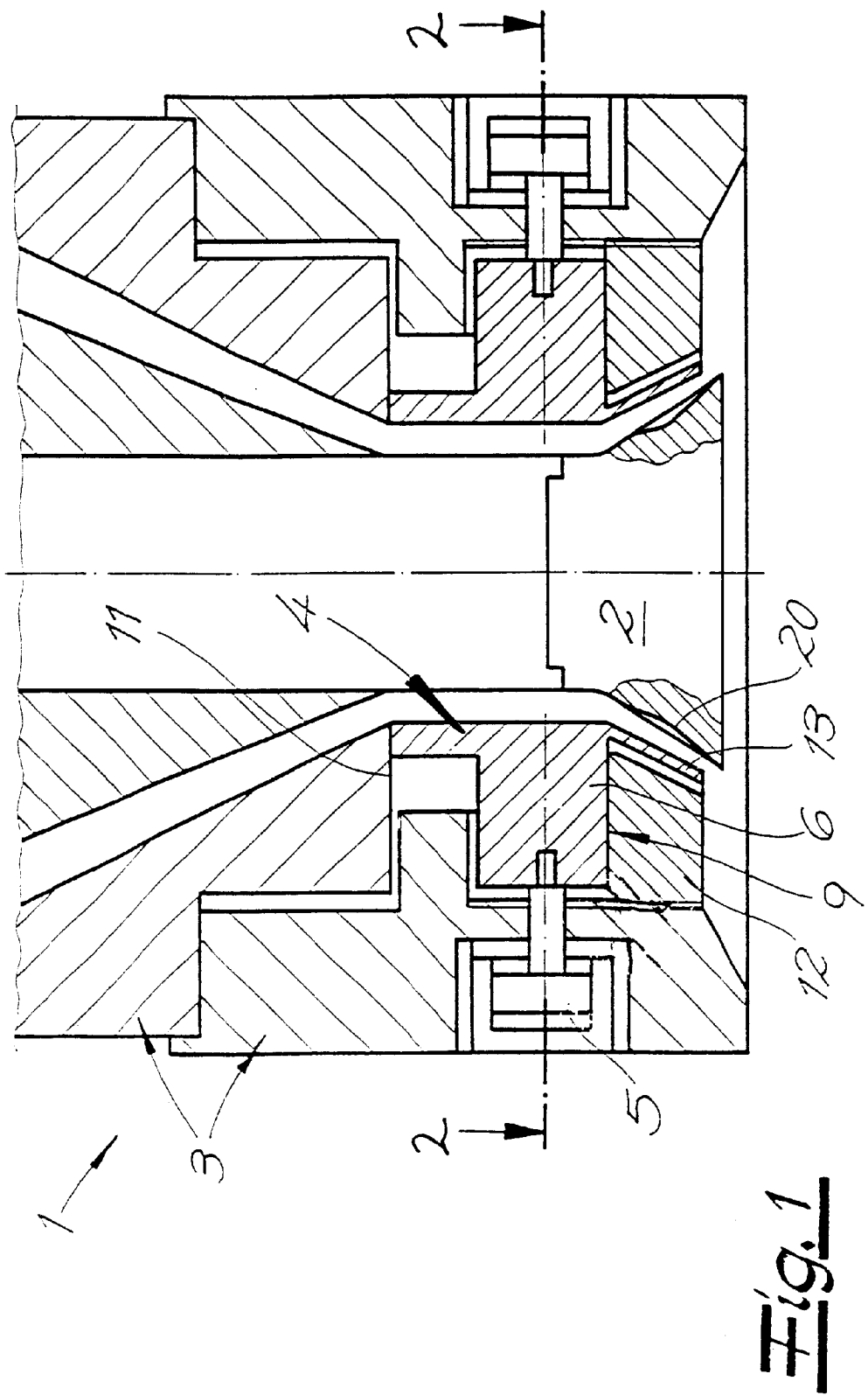
FIG. 1 is a longitudinal cross sectional view through a ring gap nozzle of an extruder head.
Figure 2:
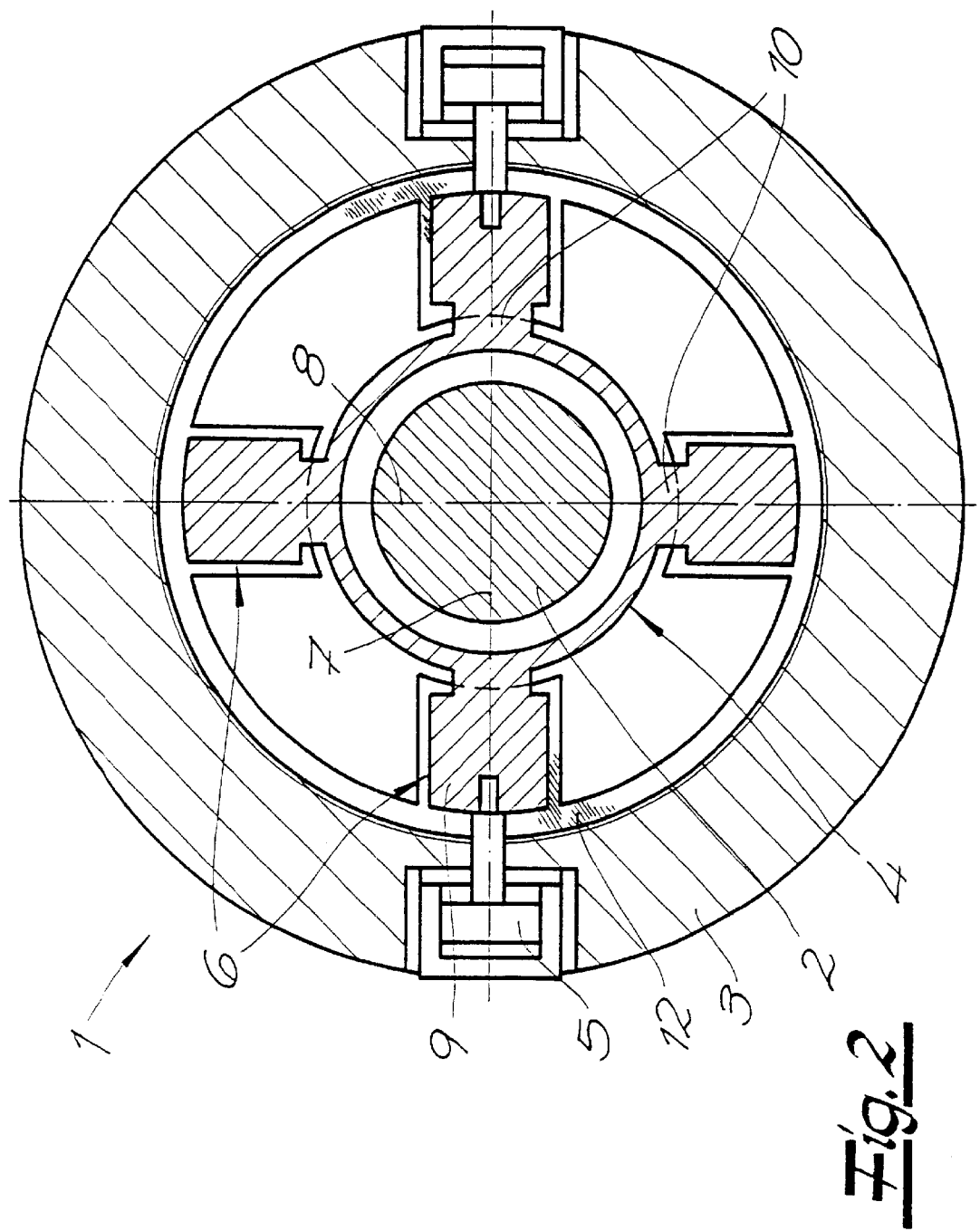
FIG. 2 shows the section 2—2 of FIG. 1.

Referring now in detail to the drawings and, in particular, FIGS. 1 and 2, there is shown an extruder head which has a ring gap nozzle 1 with a mandrel 2, a ring-shaped nozzle body 3, as well as an elastically deformable sleeve 4. Sleeve 4 may be arranged in the body of the nozzle and/or on mandrel 2. The jacket of elastic sleeve 4 is engaged by the setting devices 5. Sleeve 4 can be radially deformed by the setting movements of said setting devices 5. Mandrel 2 and sleeve 4 define a nozzle gap. The width of the nozzle gap can be changed by axial setting movements of mandrel 2 and/or the nozzle body 3, and its geometry can be influenced by deforming sleeve 4 as a hose-like, pre-shaped blank is being extruded. The axial setting movements of mandrel 2 and/or nozzle body 3, and the radial setting movements exerted on sleeve 4 are program-controlled.

Sleeve 4 is supported in nozzle body 3 and/or on mandrel 2 only on segment-like surfaces. In the embodiments of the invention shown in FIGS. 1 to 9, sleeve 4 has the cams 6, which are connected on the jacket side and arranged spaced from each other in the circumferential direction. These cams are axially supported in the nozzle body. At least two cams 6 are required for supporting sleeve 4. The axial forces applied by the melt to the sleeve and/or occurring when the sleeve is elastically deformed, can be introduced into the body of the nozzle via the cams, whereby the latter may be supported in the body of the nozzle on the underside or both on the bottom and top sides depending on the design.

The spacing of the cams from the bottom side end of the sleeve can be fixed in any desired way. It is within the framework of the present invention to arrange cams 6 at the inlet side end of sleeve 4. Cams 6 are preferably provided on the jacket between the inlet side and outlet side ends of the sleeve. The cam support of nozzle body 3 is in this connection, always arranged on the circumference of sleeve 4 so that the flow of melt exiting from the annular gap cannot accumulate on nozzle body 3.

The molded-on cams 6 stiffen sleeve 4 only on the circumferential sections of the sleeve. The sleeve sections located between cams 6 are deformable by the setting device acting on the sleeve 4. The support surface of the cams for providing support in nozzle body 3 can be freely designed in any desired form irrespective of the way in which the cams are tied on. Support surfaces 9 can be dimensioned so that permissible pressures acting on the surfaces will not be exceeded, i.e. pressures permitting a low-wear sliding motion between cams 6 and the associated counter surfaces of the nozzle body or mandrel. According to a preferred embodiment, therefore, cams 6 have a wide support surface for support on the nozzle body or mandrel, and neck 10 with a smaller width, the neck being shaped by molding on the jacket surface of the sleeve. The width of neck 10 and the width of support surface 9 can be fixed independently of one another so that a good support of sleeve 4 is assured, on the one hand, and the deformation of sleeve 4 by the connecting elements is impaired as little as possible on the other.

In the embodiment according to FIGS. 1 and 2, sleeve 4 is supported on four cams 6 arranged on the circumference with equidistant spacings, the cams being arranged on the axis on which the force of setting devices 5 is acting, and transversely to the action of the force of setting devices 5. In the circumferential direction, cams 6 have a wide support surface 9 for support on nozzle body 3, as well as a neck 10 of lesser width molded onto the jacket surface of sleeve 4 (FIG. 2). A stiffening effect of cams 6 on sleeve 4, which is undesirable in most cases, remains limited to circumferential sections, which is small compared to the total circumference of sleeve 4. The circumferential sections between cams 6 remain elastically deformable.

With the embodiment shown in FIGS. 1 and 2, sleeve 4 is radially movable with its inlet side edge against surface 11 of the nozzle body, and uniformly radially adjustable in the partial zones of the circumference over its entire length. Cams 6 which support sleeve 4 and absorb the load, are radially movably resting on a holding ring 12, which is inserted in nozzle body 3 on the underside of the nozzle. Cams 6 are arranged at the level of setting devices 5, whereby cams 6 are arranged along axis 7 in the direction of force of setting devices 5 and are connected with the latter. Sleeve 4 has a deformable collar 13, which engages the inside diameter of the holding ring 12 with radial play and forms the outer wall of the annular gap. FIG. 2 shows that holding ring 12 has no through-extending annular surface, but cooperates with cams 6 of sleeve 4 in the form of a bayonet lock.

Sleeve 4 is axially insertable in the nozzle body up to a stop and lockable in nozzle body 3 by a turning motion. This arrangement permits sleeve 4 to be installed and removed from the underside of ring gap nozzle 1. The components are exchangeable in a similar way in the embodiment shown in FIGS. 3 and 4. It is possible also within the framework of the present invention to install and remove holding ring 12 with sleeve 4 as a pre-assembled unit, whereby holding ring 12 may be lockable into nozzle body 3, for example by a bayonet-type quick-action lock.

In the embodiments shown in FIGS. 3 to 7, sleeve 4 is retained within the nozzle body at its inlet side end with an axial sliding seat, so that when sleeve 4 is deformed radially, the inlet side edge of sleeve 4 is movable in the axial direction. In the embodiment shown in FIGS. 3 and 4, two cams 6 are arranged to support the sleeve transversely to the action of the force of the setting devices just before the upper, inlet side end of sleeve 4. In the embodiment according to FIG. 5a and 5b, the support is provided with a spacing from the inlet side end, e.g. at the level of radial setting devices 5. Since the inlet side end of the sleeve is not displaceable radially, the deformation of sleeve 4 is connected with a swivelling motion especially in the presence of equidirectional setting movements of setting devices 5. In order to assure uniform support of cams 6, the cams are supported on at least one surface 14, which permits a tilting movement and, in the embodiment, adapts itself to the tilting motion of cams 6.

Figure 5A:
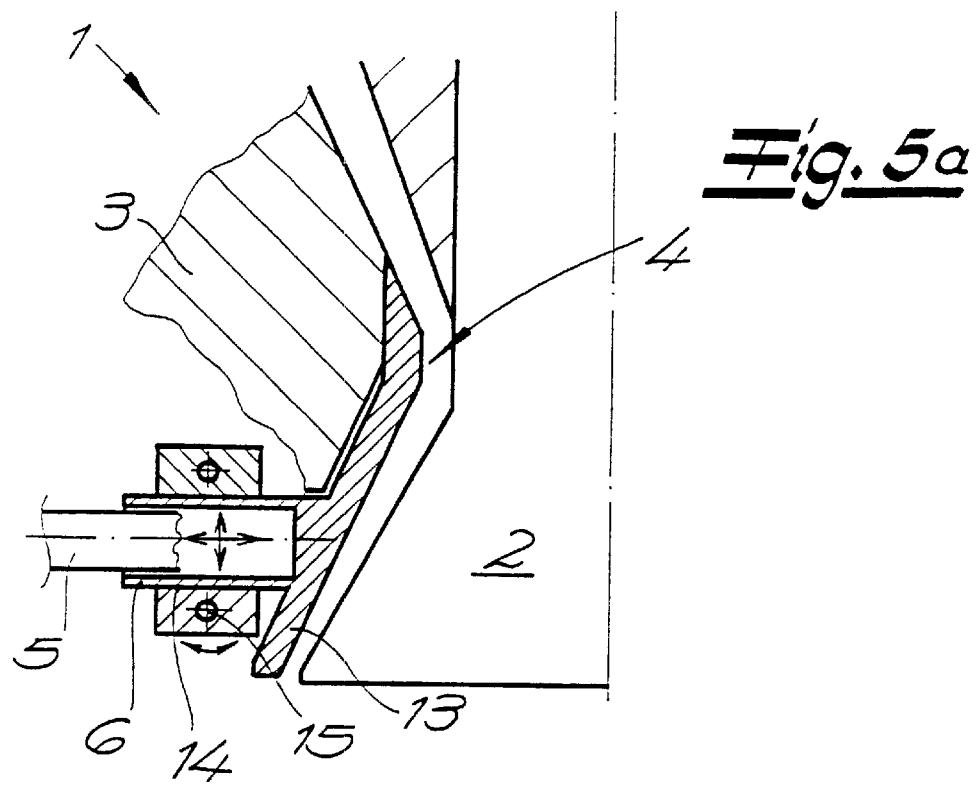
FIGS. 5a and 5b show another embodiment of the extruder head where the support surface tilts around an axis of rotation.
Figure 6:
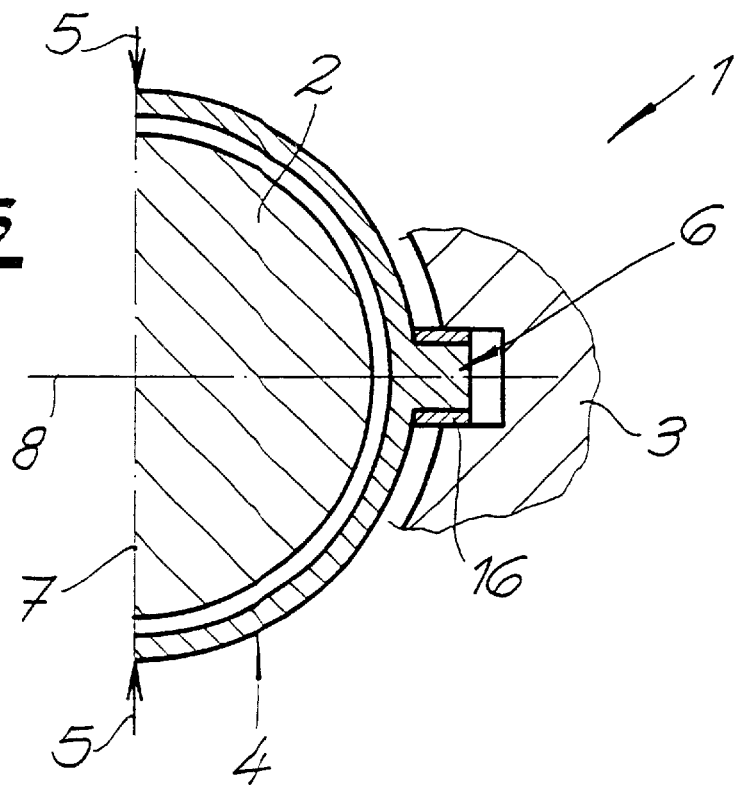
FIG. 6 shows another embodiment in which the cams are designed as pins.
Figure 7:
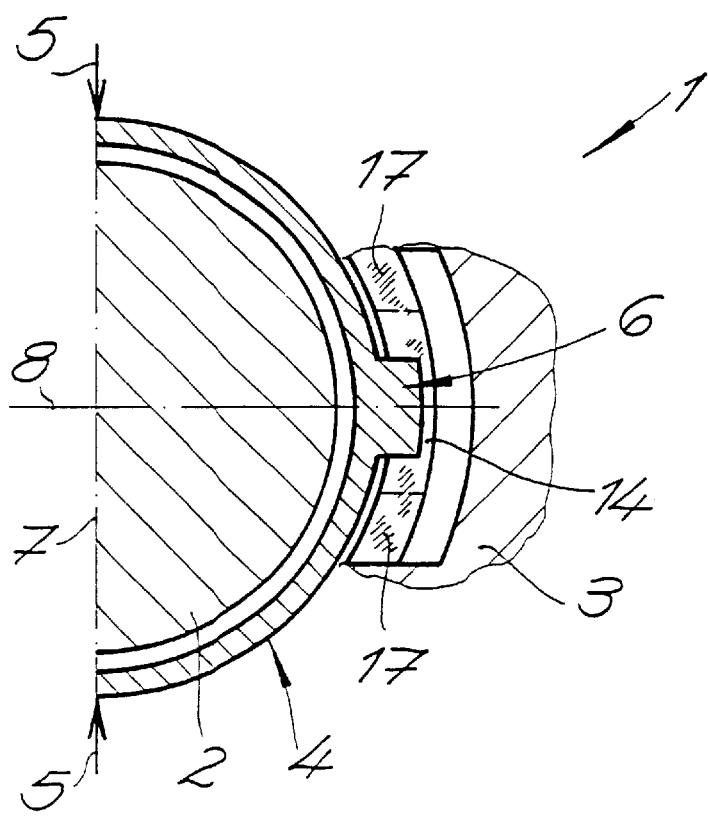
FIG. 7 shows another embodiment in which the support surface can adapt to the tilting movement of the cams.

In the embodiment of FIG. 5a, support surface 14 is arranged so that it can tilt about an axis of rotation 15 transverse to the line of action of the force of setting devices 5. In the embodiment of FIG. 6, cams 6 are designed in the form of pins, which are aligned transversely to the line of action of the force of setting devices 5 and slidingly supported in a pin receptacle of nozzle body 3, and, furthermore, supported by wear or bearing sleeve 16. It is understood that cams 6 also may contain pin receptacles engaged by pins. The pin receptacle also may be arranged on a carriage, which is movable transversely to the axis of rotation of the pin. In the embodiment of FIG. 7, cams 6 are supported on a surface 14, which, according to the rules of statics, is designed in the form of a beam on two supports 17, and can adapt to the tilting movement of cams 6. As an alternative, it is possible to provide cup springs for movably supporting cams 6. The axial supports of sleeve 4 in nozzle body 3 may be located at any desired level of sleeve 4.

Figure 8A:
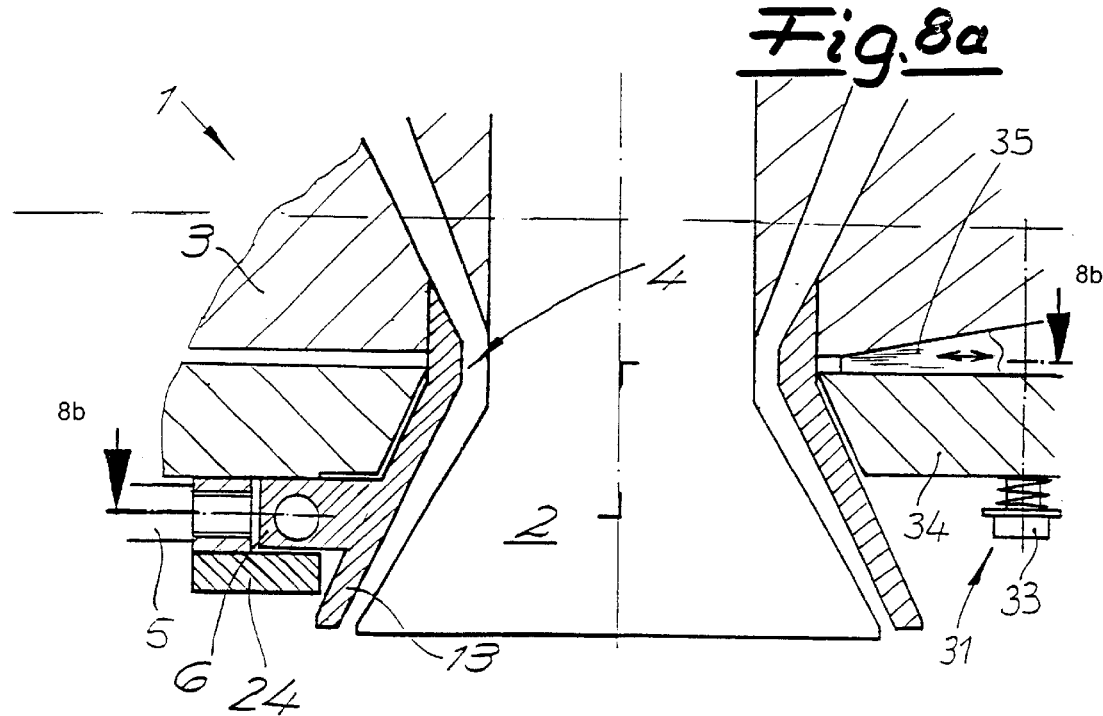
FIGS. 8a and 8b show another embodiment in which the segment surfaces can be moved in relation to each other.
Figure 8B:
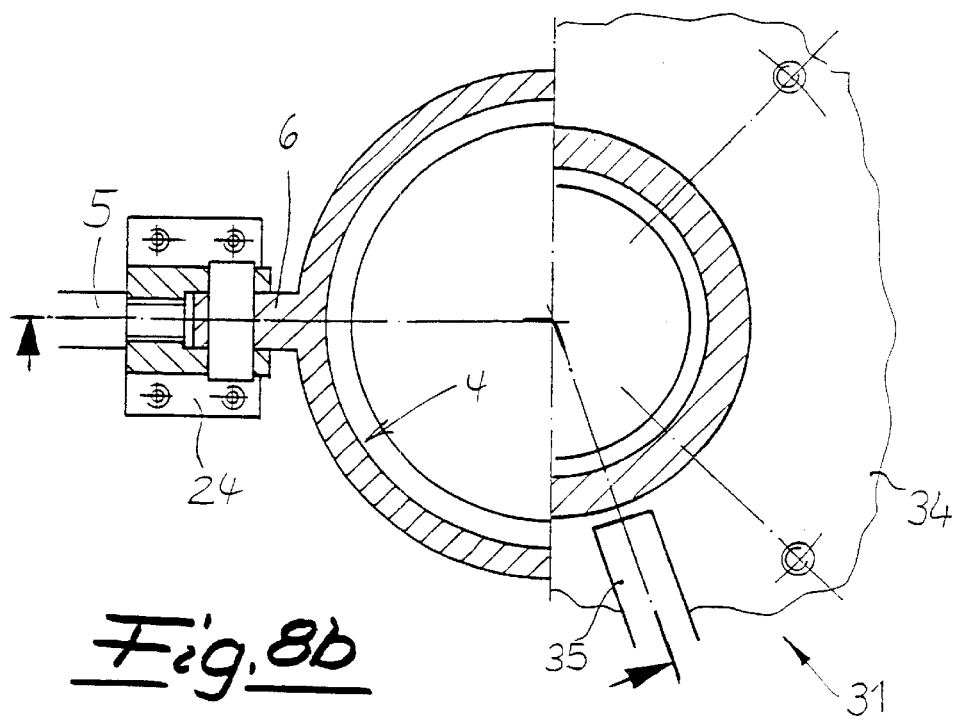

FIGS. 8a and 8b show by a longitudinal, as well as a cross sectional view of another embodiment of the extrusion head. The elastically deformable sleeve 4 is arranged with axial displaceability (or seated with axial slideability) in nozzle body 3, and has two or more cams 6 on its circumferential side. The melt pressure prevailing in the annular gap exerts an upwardly directed force on sleeve 4, which is conically expanding toward the nozzle outlet. This force is absorbed by cams 6, which are supported on the top side on a slide surface of the nozzle body. Setting devices 5 are guided with a sliding seat on plate 24 on the underside, plate 24 being screwed to nozzle body 3. A gap remains between plate 24 and cams 6. The gap permits tilting movements of cams 6 when sleeve 4 is deformed radially.

Figure 5B:
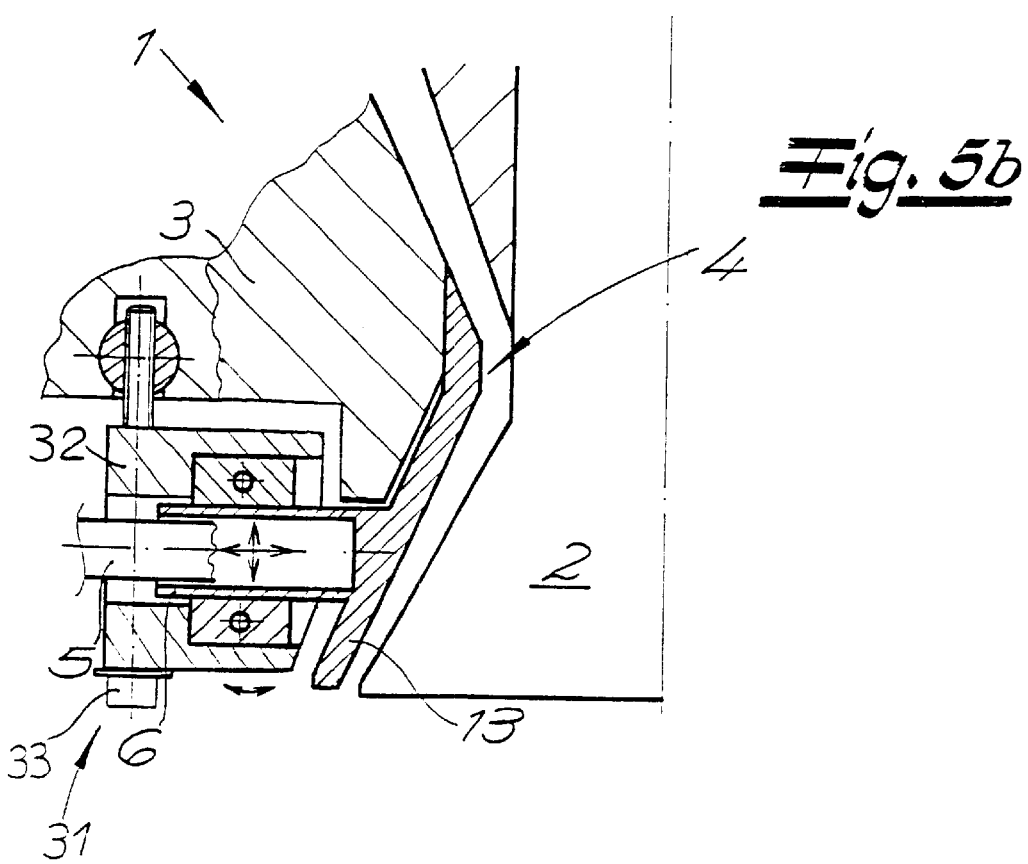

In connection with the embodiments described above, where sleeve 4 is held within nozzle body 3 with an axial sliding seat at its inlet side end, it is also possible to provide an actuating device 31 in order to move the segment surfaces in relation to each other in the axial direction. Several possibilities are available for the constructional design. In the embodiment of FIG. 5b, at least one of cams 6 is arranged on the circumference of sleeve is supported on a bearing plate 32, which is axially adjustable by setting device 33. The setting device may consist of a manually actuated set screw. However, setting device 33 also may have a servo-drive acting in the axial direction, the servo-drive performing program-controlled setting movements while a pre-shaped blank is extruded. As a result of the setting movements of the bearing plates 32 (FIG. 5a) and cam 6 supported on the bearing plate, sleeve 4 performs tilting movements that change the geometry of the nozzle gap. This arrangement permits additional geometry changes of the annual gap of the nozzle, which is advantageous, for example when parts with thick walls are extruded for blow molding. Wide nozzle gaps are required to make thick-walled parts from blow molding. The deformations for the displacement distance have to be dimensioned correspondingly large as well. Superpositioning of the described setting movement of the bearing plate, on the one hand, the movement is associated with a tilting movement of the sleeve, and the deformation of the sleeve, on the other hand, permits adequate corrections of the nozzle gap even when hoses with thick walls are extruded.

FIGS. 8a and 8b show a further constructional design, by which the segment surfaces can be moved in relation to each other in the axial direction as well. The cams arranged on the circumference of the sleeve are supported on ring 34, which is supported with the elasticity of a spring. The actuating device has a radially displaceable wedge 35, which engages between ring 34 and the body of the nozzle. The actuating device 31 acts unilaterally on ring 34, so that the action of the actuating device causes the ring to perform tilting movements.

Figure 9A:
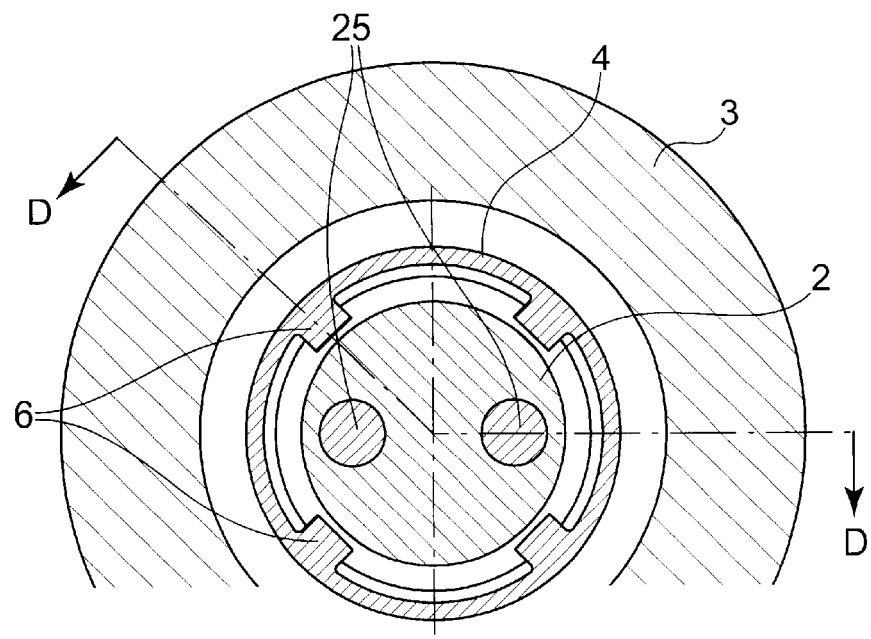
FIG. 9a is a cross sectional view of section E—E of FIG. 9b showing another embodiment of an extrusion head.
Figure 9B:
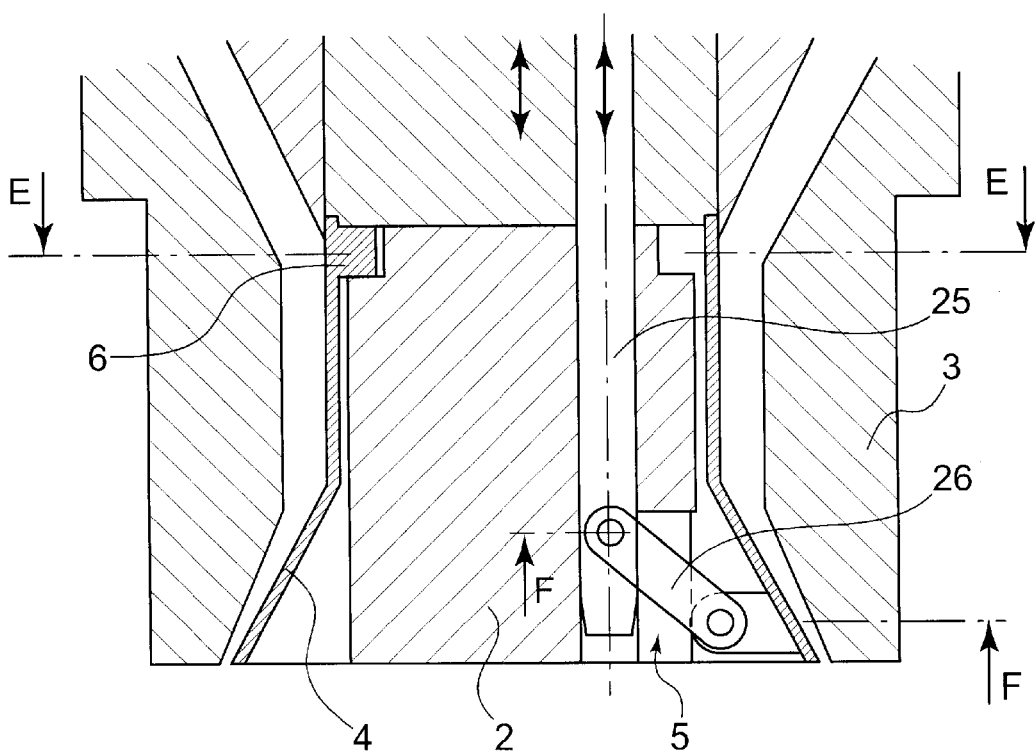
Figure 9C:
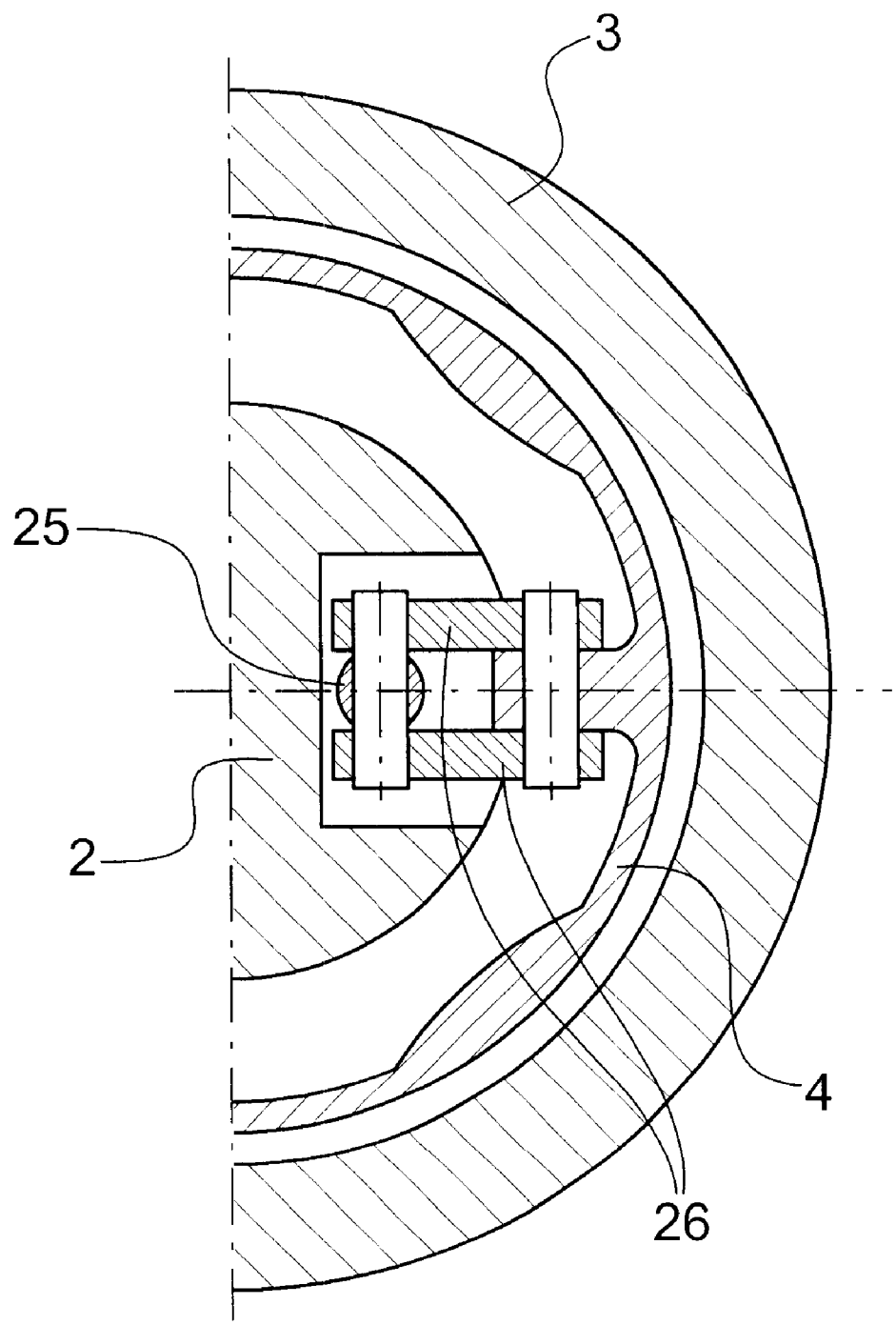
FIG. 9c is a cut-out taken through line F—F of FIG. 9b.

FIGS. 9a to 9c, show another embodiment of an extrusion heads, wherein the elastically deformable sleeve 4 is arranged on mandrel 2. Comparative viewing of FIGS. 9a to 9c shows that at its inlet side, upper end, sleeve 4 has inside cams 6, which are axially supported on mandrel 2. The support can be provided by two or more cams 6. In the present embodiment, four cams 6 are provided and arranged at equidistant spacings, and offset at an angle of 45 degrees relative to the line of action of setting devices 5. Setting device 5 for radially deforming the sleeve has at least one set bar 25, which is connected to the inside of the sleeve via a lever 26. In the present embodiment, there is provided two separately actuated set bars 25 with associated levers 26. Furthermore, FIG. 9c shows that sleeve 4 has a wall thickness profile with thick and thin sections. The thickened sections influence the radial deformation of sleeve 4, as well as its profile when setting devices 5 are actuated.

Another embodiment of the extrusion head of the invention is shown in FIG. 10, with an elastically deformable sleeve 4 inserted in nozzle body 3. At its inlet side end, sleeve 4 has a ring-shaped collar 27, which is not supported over its entire annular surface, but only over segment-like surfaces. The effects described above can also be obtained in this way. Nozzle body 3 has an annular surface for supporting sleeve 4, which, for supporting the sleeve in segments, is provided in the circumferential direction with the elevations 28 and/or the slots 29. Elevations 28, which are visible in FIG. 10 in the section on the right-hand side, support collar 27 of sleeve 4 upwardly and downwardly. Slots 29 shown on the left-hand side, permit axial movement of collar 27 of sleeve 4 upwardly and downwardly. Alternatively, the support surface of annular collar 27 could also have a profile with projections and/or recesses for supporting sleeve 4 in segments. It is understood that the described support could also be employed in connection with sleeve 4 that is arranged on mandrel 2. Furthermore, the radial wall thickness of annular collar 27 may be uneven in the circumferential direction.

The geometry of the ring gap is variable in the course of extrusion of a pre-shaped blank by deforming elastic sleeve 4. This does not exclude additional devices from acting on the passage of the melt, wherein these devices also effect the wall profile of the pre-shaped blank. For example, mandrel 2 may have grooves 20 extending in the longitudinal direction of the flow, with the depth of these grooves increasing or decreasing in the direction of the nozzle orifice (FIG. 1), or being constant, or the mandrel may have any other desired profile in the longitudinal direction. Furthermore, it is possible to equip nozzle body 3 and/or mandrel 2 with an adjustable profiling device 21 for engaging the flow zone of the annular gap. According to the embodiment shown in FIG. 3, profiling device 21 consists of, for example a slider sleeve, which is axially movable on a spindle sleeve 22 independently of mandrel 2. The surface of profiling device 21 and/or an opposite conical section of the nozzle body are profiled in the circumferential direction. Instead of using a slider sleeve arranged axially parallel with the mandrel, it is also possible to arrange radially movable sliders in the body of the nozzle, the sliders serving as profiling device 21. All profiling devices 21 described above may be arranged in a zone of the passage (or channel) above sleeve 4, or also in another site of the annular gap.

Figure 3:
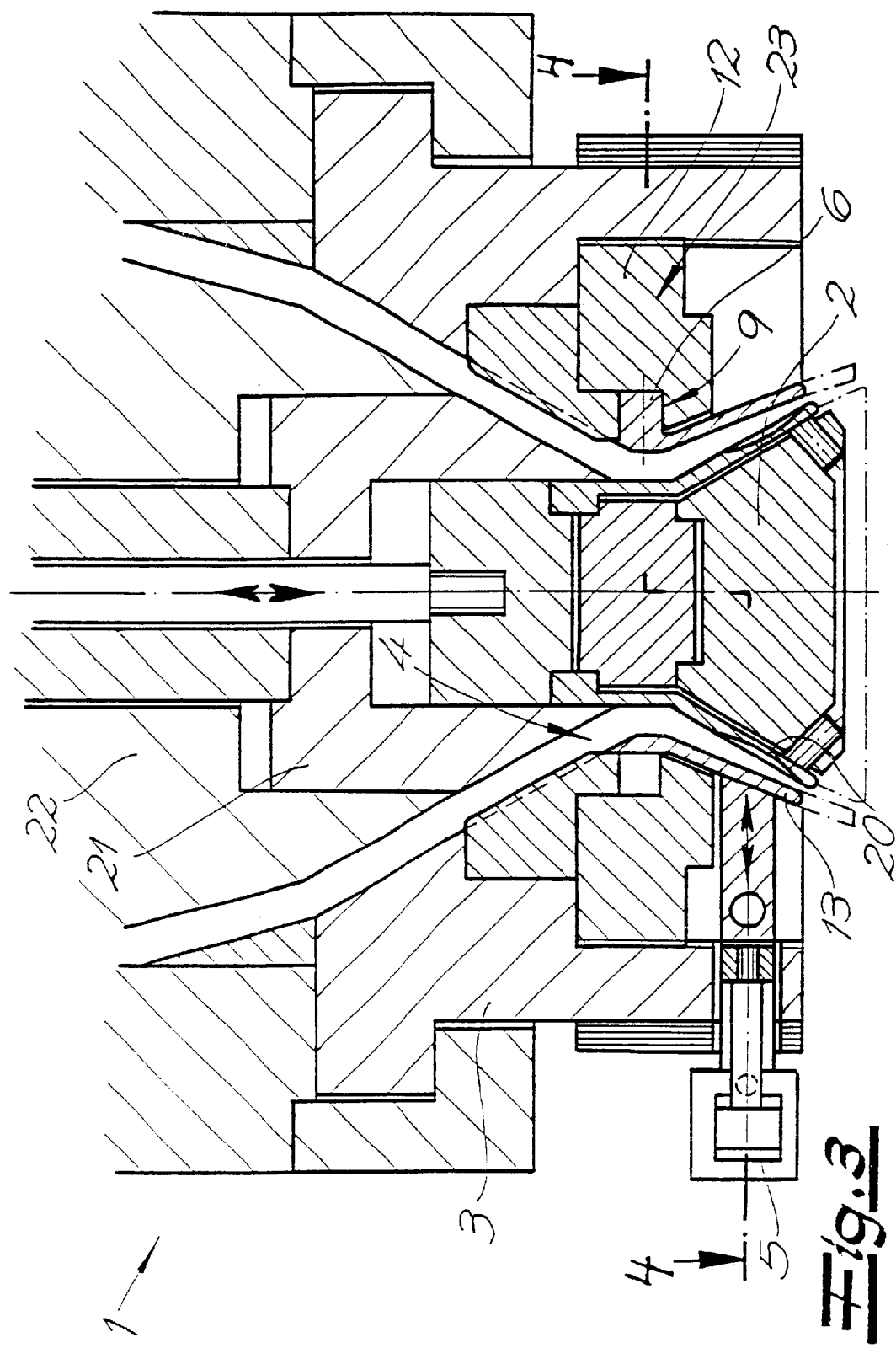
FIG. 3 is a cross sectional view through of a second embodiment of the extruder head 3—3 of FIG. 4.
Figure 4:
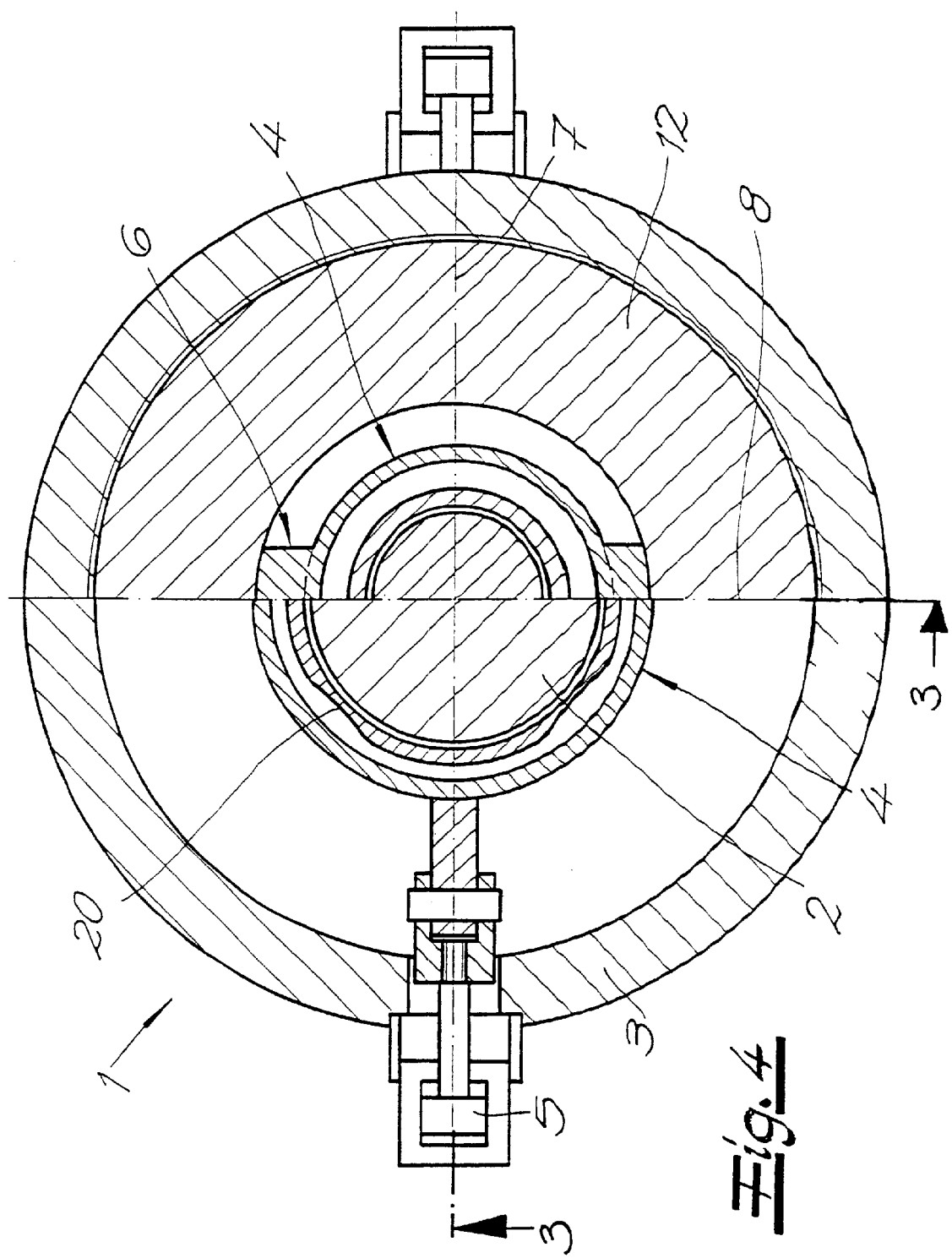
FIG. 4 shows the section 4—4 of FIG. 3.

When plastic containers with different cross sectional shapes and/or different container diameters have to be produced, the settings adjustments or changes required on the extrusion head, as defined by the invention, can be carried out quickly and with low technical expenditure. Nozzle body 3 is designed as a multi-component part and has a nozzle top component as well as a ring-shaped, exchangeable insert 23 (FIG. 3). Setting devices 5, acting on sleeve 4, are connected to the top component of the nozzle, whereby the connection acting on sleeve 4 is disconnectable by means of a quick-release type coupling. After the coupling has been released, insert 23 with sleeve 4 and mandrel 2 can be replaced without removing the top part of the nozzle and setting devices 5. It is also possible to exchange the unit consisting of sleeve 4, holding ring 12, and ring 30 screwed to holding ring 12, as a complete assembly.

In summary, it has to be noted that the desired deformation of sleeve 4 is accomplished through the arrangement and the dimensions of the segment-like support surfaces, for example through cams 6 and/or the thickness of sleeve 4 over the circumference or only one vertical section, in association with the number, the dimensions and the arrangement of the sites engaged by the force.

Accordingly, while only a few embodiments of the present invention have been shown and described, it is obvious that many changes and modifications may be made thereunto without departing from the spirit and scope of the invention.

What is claimed is:

1. An extrusion head for blow forming extruded plastic containers, comprising:
   a ring gap nozzle (1) having a ring-shaped nozzle body (3) and a mandrel (2) centrally disposed within said nozzle body (3);
   an elastically deformable sleeve axially supported on segment-like surfaces of cams which are coupled to a jacket side and spaced apart relative to each other in the circumferential direction;
   setting devices (5) for radially deforming said elastic sleeve (4);
   whereby said sleeve (4) defines a nozzle gap, the geometry of which can be adjusted by deforming said sleeve (4) during the extrusion of a hose-like, preshaped blank; and
   wherein at an inlet side, said sleeve (4) is supported within said nozzle body (3) with axial displaceability so that when said sleeve is radially deformed an inlet side edge of said sleeve (4) is movable in the axial direction, and the cams (6) are disposed in a plane below the inlet side edge and are supported on a support surface (14) of said nozzle body, said support surface (14) permitting a tilting movement of said cams.

2. The extrusion head according to claim 1, wherein said cams (6) are axially supported in said nozzle body (3).

3. The extrusion head according to claim 1, wherein said cams (6) have a wide support surface (9) in the circumferential direction, and a neck (10) of lesser width, said neck being molded onto the jacket side surface of said sleeve (4).

4. The extrusion head according to claim 1, wherein said cams (6) are identical and equally spaced apart at the same level.

5. The extrusion head according to claim 1, wherein said cams (6) arranged on the circumference have different widths in the circumferential direction to provide non-symmetrical deformation of said sleeve (4).

6. The extrusion head according to claim 1, wherein said cams (6) are arranged on the circumference of said sleeve with non-equidistant spacings in order to provide non-symmetrical deformation of said sleeve (4).

7. The extrusion head according to claim 1, wherein said sleeve (4) is partially insertable in said nozzle body (3) up to a stop, and lockable in said nozzle body (3) by a turning movement, whereby said cams (6) engage corresponding support surfaces of said nozzle body (3) from behind by means of a bayonet lock or claw coupling.

8. The extrusion head according to claim 1, comprising an annular holding ring (12) inserted in said nozzle body (3) said cams being supported on said holding ring (12) and said sleeve (4) has a deformable collar (13) engaging the inside diameter of said holding ring (12) with radial play.

9. The extrusion head according to claim 1, wherein said support surfaces (14) adapts to the tilting movement of said cams (6).

10. The extrusion head according to claim 9, wherein said support surface (14) is arranged with tilting mobility about an axis of rotation (15) transverse to the direction of force of said setting devices (5).

11. The extrusion head according to claim 9, wherein said support surface (14) comprises a beam disposed on two supports (17) coupled to said nozzle body (3).

12. The extrusion head according to claim 1, wherein said cams (6) comprise pins or pin receptacles aligned transverse to the direction of force of said setting devices (5) and are supported with sliding mobility in said nozzle body.

13. The extrusion head according to claim 1, wherein said setting devices (5) are connected to said cams (6).

14. The extrusion head according to claim 1, wherein said nozzle body (3) comprises a nozzle top part and a ring-shaped insert (23), whereby said setting devices (5) acting on said sleeve (4) are connected to the nozzle top part, said cams (6) are supported on said insert (23), whereby said insert (23) with said sleeve (4) and said mandrel (2) are exchangeable without removal of the nozzle top part and said setting devices (5).

15. The extrusion head according to claim 1, wherein at its inlet side end, said sleeve (4) is retained within said nozzle body (3) on an axial slide seat, so that during radial deformation of said sleeve, the inlet side edge of said sleeve (4) is movable in the axial direction, and further comprising an actuating device (31) for moving said segment-like surfaces relative to one another in the axial direction.

16. The extrusion head according to claim 15, comprising a bearing plate (32) for supporting at least one cam (6), said bearing plate being axially adjustable by a setting device (33).

17. The extrusion head according to claim 15, comprising an elastic support ring (34) for supporting said cams (6) and wherein said actuating device (31) unilaterally acts upon said support rings (34), causing said ring to perform tilting movements.

18. The extrusion head according to claim 17, wherein said actuating device (31) has a radially displaceable wedge (35) engaging between said ring (34) and said nozzle body (3).

19. An extrusion head for blow forming extruded plastic containers, comprising:
   a ring gap nozzle (1) having a ring-shaped nozzle body (3) and a mandrel (2) centrally disposed within said nozzle body (3);
   an elastically deformable sleeve (4) axially supported on segment-like surfaces and disposed between said nozzle body (3) and said mandrel (2);
   setting devices (5) for radially deforming said sleeve (4);
   whereby said sleeve (4) defines a nozzle gap, the geometry of which can be adjusted by deforming said sleeve (4) during the extrusion of a hose-like, pre-shaped blank;
   wherein said sleeve (4) has a ring-shaped collar (27) at an inlet side end, said collar being axially supported on the segment-like surfaces;
   wherein said nozzle body (3) has an annular surface for supporting said sleeve (4), said annular surface having elevations (28) and slots (29) for supporting the sleeve in segments in the circumferential direction; and
   wherein the elevations support the collar of the sleeve upwardly and downwardly and wherein the slots permit actual movement of the collar of the sleeve.

20. The extrusion head according to claim 19, wherein a support surface of the ring-shaped collar (27) has a profile with projections and/or recesses for supporting said sleeve (4) in said segment-like surfaces.

21. The extrusion head according to claim 19, wherein the radial wall thickness of said ring-shaped collar (27) is uneven in the circumferential direction.

22. An extrusion head for blow forming extruded plastic containers, comprising:
   a ring gap nozzle (1) having a ring-shaped nozzle body (3) and a mandrel (2) centrally disposed within said nozzle body (3);
   an elastically deformable sleeve (4) axially supported on segment-like surfaces and disposed between said nozzle body (3) and said mandrel (2);
   setting devices (5) for radially deforming said sleeve (4);
   whereby said sleeve (4) defines a nozzle gap, the geometry of which can be adjusted by deforming said sleeve (4) during the extrusion of a hose-like, pre-shaped blank;
   wherein said sleeve (4) has a ring-shaped collar (27) at an inlet side end, said collar being axially supported on segment-like surfaces;
   wherein said mandrel (2) has an annular surface for supporting said sleeve (4), said annual surface being provided with elevations (28) and slots (29) for supporting said sleeve in segments in the circumferential direction.

23. The extrusion head according to claim 22, wherein a support surface of the ring-shaped collar (27) has a profile with projections and/or recesses for supporting said sleeve (4) in said segment-like surfaces.

24. The extrusion head according to claim 22, wherein the radial wall thickness of said ring-shaped collar (27) is uneven in the circumferential direction.

* * * * *